A. A. CARDWELL.
VACUUM TRAP.
APPLICATION FILED MAR. 21, 1919.

1,316,876. Patented Sept. 23, 1919.

Witnesses:
Dorothy Miatt
Isaac W Jacobson

Inventor:
ADDISON A. CARDWELL,
By his Attorney,
Geo. Wm Miatt

UNITED STATES PATENT OFFICE.

ADDISON A. CARDWELL, OF NEW YORK, N. Y., ASSIGNOR TO PRATT & CADY CO., INC., OF NEW YORK, N. Y., A CORPORATION OF NEW YORK.

VACUUM-TRAP.

1,316,876.      Specification of Letters Patent.      Patented Sept. 23, 1919.

Application filed March 21, 1919. Serial No. 284,093.

*To all whom it may concern:*

Be it known that I, ADDISON A. CARDWELL, a citizen of the United States, and a resident of the borough of Manhattan, city, county and State of New York, have invented certain new and useful Improvements in Vacuum-Traps, of which the following is a specification.

Although applicable to other and analogous uses, my improved vacuum trap is designed more particularly for use in connection with steam heating systems, where the elimination of air and the conservation of steam are desiderata, for reasons well known in the art. The object of my invention is mainly to afford simple but effective and reliable mechanical means whereby these results may be attained automatically in a constant and positive manner,—it being well known that the so called vacuum valves controlled by the expansion or contraction of elements, volatile or otherwise, are not efficacious in practice, requiring frequent adjustment or replacement, and their scope of action being restricted to comparatively slight variations in temperature.

My invention consists in the specific combination and arrangement of elements and parts described and claimed, distinctive features being the provision in the trap of separate inlets for the water of condensation and for air to be eliminated; the connection of said independent air inlet with the upper part of a radiator or the like; the provision of a steam screen which, while dry, permits of the exhaustion of air, but which when wet becomes impervious to both air and steam, so as to prevent waste of the latter; in the manner of counteracting possible retractile inductive force, etc., all as hereinafter fully set forth.

In the accompanying drawings.

Figure 1:
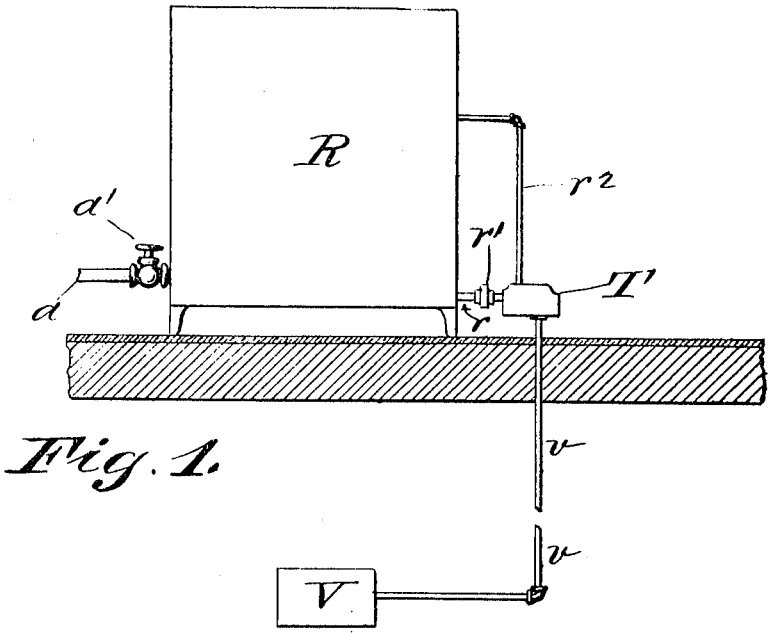
Figure 1, illustrates diagrammatically the use of my improved vacuum trap in connection with a steam radiator.
Figure 2:
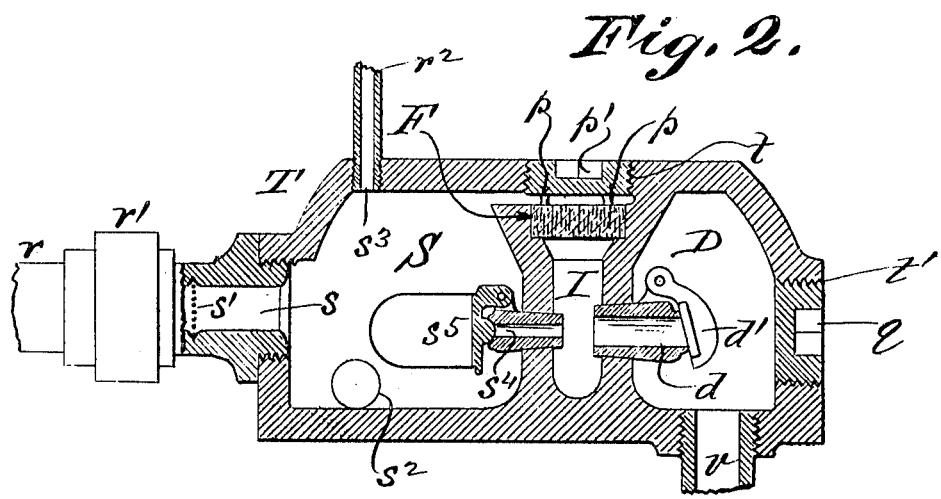
Fig. 2, is a central vertical sectional elevation of the trap etc.

I herein show and describe my trap as utilized in conjunction with a unit of a steam heating system, although as before intimated I do not necessarily limit myself thereto, it being obvious that there are analogous uses to which the essential features of my invention may be applied with like result.

Thus, in the drawings R, represents a radiator of any desired character, supplied with steam through the pipe $a$, and valve $a'$. V, represents symbolically a vacuum pump or other exhaust mechanism, with which the trap T, is connected by pipe $v$.

My trap T, is formed with three separate chambers, the settling chamber S, the intermediate exit chamber I, and the suction and discharge compartment D, with which latter the exhaust pipe $v$, communicates.

The settling chamber S, is formed with an inlet $s$, for the admission of water of condensation and air accompanying same from the lower part of the radiator R, the connection between the latter and the trap T, being made for instance, by means of a pipe $r$, and union $r'$, and a reticulated screen $s'$, being interposed in the inlet $s$, to intercept dirt or sediment that might otherwise enter the trap and impair its action. As a further precaution against the lodgment of sediment or dirt in said settling chamber S, I provide the lower portion thereof with a plugged opening $s^2$, through which access may be had on occasion to the floor of the settling chamber S, for the purpose of removing therefrom any sediment or extraneous matter that may have been carried over by the water of condensation through the screen $s'$, and inlet $s$.

The upper part of the settling chamber S, is also formed with an air inlet $s^3$, situated by preference well above the water inlet $s$, and in the top of said settling chamber S.

This air inlet $s^3$, is connected by a vent pipe $r^2$, with the upper portion of the radiator R, the usual vent opening therein being used for the purpose. Thus obviously a partial vacuum in the settling chamber S, will induct air from the upper part of the radiator R, or its equivalent, into said settling chamber S.

A conduit $s^4$, connects the settling chamber S, with the intermediate exit chamber I, but this means of communication between the two chambers, S, and I, is closed normally by a valve $s^5$, of the gravity float type,—that shown in the drawing by way of exemplification consisting of a valve plate pivotally supported above the conduit $c^4$, and formed with a hemispherical valve fitting the inlet end of said conduit $c^4$, said valve plate having attached to it a float chamber, so that when sufficient water of condensation collects in the lower portion of the settling chamber S, the valve $s^5$, will be moved from its seat on the end of the conduit $c^4$, thereby admitting of a flow of such water into the intermediate exit chamber I.

Under normal conditions a partial vacuum is maintained in the intermediate exit chamber I, by suction exerted through the discharge duct $d$, which forms the means of communication between said exit chamber I, and the suction and discharge compartment D. A check valve $d'$, controls the discharge end of the duct $d$, to prevent back pressure or induction in case of a preponderating degree of vacuum in the radiator caused by condensation of steam therein consequent upon the closing of the supply valve $a'$.

The upper portion of the intermediate exit chamber I, is separated from the upper portion of the settling chamber S, by a steam-screen F, of absorbent fibrous material which when dry, or substantially so, will allow the passage of air therethrough, but which in the contactual presence of moisture will absorb sufficient thereof to swell the fiber and render it impervious to air or steam.

There are various absorbent fibrous materials which may be used in the formation of my steam-screen F, so that I do not limit myself in this respect, the essential feature of my invention in this connection being the interposition between the settling chamber S, and the intermediate exit chamber I, of a normally porous screen adapted to admit of the passage of air through it when said screen is practically in a dry state, but which loses its porosity and becomes impervious to air and steam when exposed to moisture, owing to the closing of its pores by absorption.

I have found by experimental investigation that my steam screen F, may consist advantageously of a section of natural wood cut acrosswise of the grain,—i. e., with the fibers extending transversely between the exposed faces of the screen, so that the porosity of the wood, when dry or substantially so, will admit of the passage of air under tension through the interstices between the wood fibers from one side of the screen to the other, as for instance in consequence of a reduction of pressure in the intermediate exit chamber I, as compared with that existing in the settling chamber S. In other words, the creation of a partial vacuum in the said intermediate exit chamber I, by reason of its connection through the discharge duct $d$, with the suction compartment D, will suck air from the top of the settling chamber S, through the steam screen F, (when dry) into said intermediate exit chamber I, to be removed therefrom in due course through said discharge duct $d$. If however the wooden screen F, becomes moist, as from steam escaping into the trap T, from the radiator R, the wood fiber immediately swells and closes the interstices therebetween, thus sealing the partition-screen F, against the passage therethrough of both steam and air from the settling chamber S, to the intermediate exit chamber I.

The steam-screen F, may be held to its seat in the upper walls of the intermediate exit chamber I, by any suitable mechanical expedient, as by protuberances $p$, on the inner side of the screw plug $p'$, which closes the hole $t$, through which the partition screen F, is inserted into position and through which access may be had to the chamber I, for clearing same, etc. $q$, is a similar plug closing an aperture $t'$, opposite the check valve $d'$, through which access may be had to the discharge duct $d$, and conduit $s^4$, for a like purpose. Access may be had to the reticulated screen $s'$, when desired, by the removal of the union $r'$. The cross area of the discharge duct $d$, is larger than that of the conduit $s^4$, to enable it to accommodate the outflow of air as well as water from the intermediate exit chamber I, to the suction and discharge compartment D.

The functions of my porous absorbent steam screen are equivalent to those of the temperature-actuated vacuum valves heretofore used to check the escape of steam, only it performs such functions in a more effective manner. In the first place its simplicity distinguishes it from the complicated and delicate vacuum valves, so called, which are initially expensive, and after installation need constant inspection and adjustment in order to keep them in operative condition; in the second place, it is not limited to action between certain degrees of temperature as they are; and in the third place, while performing the function of an automatic valve, it is not strictly a valve in a mechanical sense, but rather a steam detector and check. Furthermore its cost is nominal, and there are no operative parts to get out of order; neither does it need adjustment or regulation of any kind after being once positioned in its seat in the trap.

In fact in both construction and operation the whole trap is very simple, and there is practically nothing to get out of order or that requires readjustment after installation, the only mechanically operative parts being the float valve $s^5$, and the check valve $d'$, which are gravity valves pure and simple, without accessory parts, delicate or otherwise.

As the main function of the steam-screen F, is to effect the elimination of air from the radiator as well as to prevent waste of live steam that might otherwise escape through the trap to the suction and discharge compartment D, it is obvious that the air drawn through said steam-screen should be relatively dry so as to keep the interstices open until the air is fully exhausted prior to the entrance of steam into the trap, which latter event will of course result in the closing of the screen. Hence my independent air inlet $s^3$, is not only of importance in enabling me to tap the upper part of the last loop of the radiator for the removal of air therefrom, (it being well known the air is most apt to collect therein) but it also insures the removal of the air in a comparatively dry state, sufficiently so to enable it to effect its escape through the steam-screen F, before the possibility of the closure of the latter by the entrance of steam into the trap. Furthermore, owing to the peculiar construction of the trap, the inlet of air at the top thereof, as stated, and the provision made for drawing air from the top of the settling chamber S, through my steam-screen F, the air carried into the trap from the lower part of the radiator with the water of condensation as a vehicle, will readily separate therefrom in the settling chamber S, and will be also drawn off in due proportion through said screen F, as long as the latter is permeably dry.

The main function of the check valve $d'$, at the discharge end of the duct $d$, is as before intimated, to protect the trap and radiator against back flow in the event of a predominating degree of vacuum arising in the radiator by the condensation of steam therein, succeeding the closure of the steam inlet valve $a'$. It also at the same time protects the under side of the steam screen F, from closure by contact with back flow moisture under the condition named, so that the screen is ready for the escape of air as soon as normal conditions are restored by the admission of fresh steam into the radiator. This prevention of possible back flow by means of the check valve $d'$, is also an important factor in keeping the trap clean and efficient, and is supplemented in this respect by the reticulated screen $s'$,—so that simplicity of structure and action of operative parts, combined with cleanliness insures accurate and positive automatic response and adaptability to the varying circumstances and requirements of use; the freedom from necessity for inspection and adjustment, or readjustment or replacement of parts, also rendering my trap available for use under any and all conditions no matter how exacting.

It is understood that by the term partial vacuum as herein employed I mean to designate any workable difference in pressure between the inlet and outlet side of my trap.

What I claim as my invention and desire to secure by Letters Patent is,

1. A vacuum trap of the character designated comprising a settling chamber, a water inlet thereto, an air inlet thereto above said water inlet, a suction compartment connected with exhaust mechanism, an exit chamber intermediate between said settling chamber and said suction compartment, a steam screen of absorbent fibrous material interposed between said intermediate exit chamber and the upper part of the settling chamber, said steam screen being adapted when dry to admit the passage of air but being impervious to air and steam when wet, a conduit connecting said settling chamber and said intermediate exit chamber, a float valve in the settling chamber controlling said conduit, a discharge duct between said intermediate exit chamber and said suction compartment, and a check valve in the latter controlling said discharge duct, for the purpose described.

2. A vacuum trap of the character designated comprising a settling chamber, a water inlet thereto, an air inlet thereto above said water inlet, a suction compartment connected with exhaust mechanism, an exit chamber intermediate between said settling chamber and said suction compartment, a steam screen of wood, having its fibers extending transversely as related to the faces of said screen, interposed between said intermediate exit chamber and the upper part of the settling chamber, a conduit connecting said settling chamber and said intermediate exit chamber, a float valve in the settling chamber controlling said conduit, a discharge duct between said intermediate exit chamber and said suction compartment, and a check valve in the latter controlling said discharge duct.

3. In combination with a steam radiator, a vacuum trap of the character designated formed with a settling chamber having an inlet for the water of condensation from said radiator, a reticulated screen through which the water of condensation has to pass to enter said settling chamber, an air inlet to said settling chamber above said water inlet and connected with the upper part of the radiator, and means for exhausting both air and water from said trap.

4. A vacuum trap of the character designated comprising a settling chamber, means for admitting vent air and water of condensation thereto, a suction and discharge compartment connected with exhaust means, and a steam screen of absorbent fibrous material interposed between said settling chamber and said suction and discharge compartment, said steam screen being adapted when dry to admit passage of air therethrough but being impervious to air and steam when wet, together with means for transferring the water of condensation from said settling chamber to said suction and discharge compartment.

ADDISON A. CARDWELL.

Witnesses:
GEO. WM. MIATT,
DOROTHY MIATT.

Copies of this patent may be obtained for five cents each, by addressing the "Commissioner of Patents, Washington, D. C."